United States Patent [19] [11] 3,970,738
Matsui et al. [45] July 20, 1976

[54] PROCESS FOR PRODUCING IRON OXIDE PRODUCTS FROM WASTE LIQUIDS CONTAINING FERROUS SALTS

[75] Inventors: Goro Matsui; Koji Toda; Nanao Horiishi; Kazuyoshi Wakimoto; Yoshifumi Nishiyama; Tsuneyoshi Taketa; Kazushi Takama, all of Hiroshima, Japan

[73] Assignee: Toda Kogyo Corporation, Hiroshima, Japan

[22] Filed: Dec. 23, 1974

[21] Appl. No.: 535,194

[30] Foreign Application Priority Data
July 15, 1974  Japan.............................. 49-81496

[52] U.S. Cl............................ 423/140; 252/62.56; 423/151; 423/632; 423/633; 423/634
[51] Int. Cl.² ..................................... C01G 49/02
[58] Field of Search .......... 423/632, 633, 634, 140, 423/142, 151, 152; 210/50; 252/62.56

[56] References Cited
UNITED STATES PATENTS

| 2,133,267 | 10/1938 | Ayers | 423/632 |
|---|---|---|---|
| 2,631,085 | 3/1953 | Bennetch | 423/632 |
| 2,665,969 | 1/1954 | Townend et al. | 423/556 |
| 2,689,167 | 9/1954 | Dovey et al. | 423/634 |
| 2,689,168 | 9/1954 | Dovey et al. | 423/634 |
| 3,574,683 | 4/1971 | Johnston | 423/632 |
| 3,619,137 | 11/1971 | Ratcliffe | 423/633 |
| 3,743,707 | 7/1973 | Iwase et al. | 423/633 |
| 3,755,554 | 8/1973 | Lailach | 423/633 |

FOREIGN PATENTS OR APPLICATIONS

| 542,237 | 6/1957 | Canada | 423/632 |
|---|---|---|---|
| 1,467,641 | 4/1967 | France | 252/62.56 |
| 23,819 | 8/1970 | Japan | 423/632 |
| 656,265 | 8/1951 | United Kingdom | 423/632 |
| 520,690 | 5/1940 | United Kingdom | 423/632 |

Primary Examiner—Oscar R. Vertiz
Assistant Examiner—Wayne A. Langel

[57] ABSTRACT

The processes for producing iron oxide products from a solution of ferrous salts selected from the group consisting of waste liquid containing ferrous salts and aqueous solution in which ferrous salts obtained from the waste liquid are dissolved, under the acid, wet and high ferrous concentration conditions. More particularly, the processes for purifying said waste liquids comprising the bivalent iron removing steps.

12 Claims, 2 Drawing Figures

3,970,738

PROCESS FOR PRODUCING IRON OXIDE PRODUCTS FROM WASTE LIQUIDS CONTAINING FERROUS SALTS

BACKGROUND OF THE INVENTION

The present invention relates to processes for producing high-quality iron oxide products from a solution of ferrous salts selected from the group consisting of waste liquid containing ferrous salts and aqueous solution in which ferrous salts obtained from the waste liquid are dissolved.

More particularly, this invention relates to the above-mentioned process in which the waste liquid is an effluent from titanium dioxide manufacturing process or from sheet steel pickling process. Such waste liquid or effluent contains manganese compounds as impurities which are difficult to remove by a usual method.

At present, waste liquids containing ferrous salts and discharged from process for producing titanium dioxide or from process for pickling sheet steel pose environmental pollution problems with ever increasing severity.

Researches have long been made by various countries on the measures to abate the pollution problems as disclosed in the U.S. Pat. No. 2,529,874, Japanese Pat. Pubs. No. 14703/1963, No. 24351/1963, No. 24770/1968, etc.

However, the treatment of the above-mentioned waste liquids for purification requires enormous investment and expenditure, imposing a heavy economical burden on the industry concerned.

On the other hand, processes have heretofore been proposed for producing commercially useful iron oxide products from such waste liquids, but the conventional processes have various drawbacks given below.

For example chiefly employed for the production of iron oxide is a process in which ferrous sulfate having a relatively low manganese content as crystallized from waste liquid discharged from sheet steel pickling process or titanium dioxide manufacturing process or from waste sulfuric acid solution is thermally decomposed to synthesize iron oxide. (This process will be hereinafter referred to as "dry process") When ferrous sulfate is thermally decomposed at a temperature of up to 700°C according to the dry process, the manganese sulfate contained in ferrous sulfate remains undecomposed (in water-soluble state), so that the manganese component can be removed without substantial difficulties by washing the resulting reaction mixture with water to obtain a ferric oxide product having a low manganese content.

Due to thermal decomposition, however, the dry process gives sulfur oxide emissions which cause serious air pollution. The immense investment and treatment cost required to control pollution therefore render the process almost infeasible. Furthermore, the dry process is limited to the synthesis of alpha-$Fe_2O_3$ unless it is practiced under special production conditions, and the process is unable to yield black iron oxide of spinel structure (magnetite) and gamma-$Fe_2O_3$.

For these reasons, another process has been introduced into use recently in which an alkali is added to a solution of ferrous salts such as ferrous sulfate and the resulting precipitate of ferrous hydroxide is oxidized with air to synthesize spinel-type iron oxide. (This process will be hereinafter referred to as "wet process") In addition to spinel-type iron oxide, the wet process produces a wide variety of iron oxides. For instance, spinel-type iron oxide gives gamma-$Fe_2O_3$ when oxidized with air at a temperature of about 120°C and yields alpha-$Fe_2O_3$ when further roasted at a temperature of at least 450°C. Moreover, the wet process has the outstanding advantage of being free of pollution experienced with the dry process owing to sulfur oxide emissions and permitting recovery of sulfur in the form of sulfate.

However, the known wet process also has the following difficulties.

Firstly, the spinel-type iron oxide prepared from a solution of manganese-containing ferrous salts using an equivalent or larger amount of alkali based on the ferrous salt solution according to the wet process invariably contains coprecipitated manganese compounds as impurities. Spinel-type iron oxide containing 0.2% or more of manganese oxides (calculated as MnO) is of poor quality for use as a black pigment, whilst ferric oxide prepared from such spinel-type iron oxide when used as a pigment fails to exhibit a satisfactory coloring ability, producing a turbid color which is low in lightness and saturation. Thus, the ferric oxide obtained is inferior in these important characteristics of pigment. Further when the above-mentioned spinel-type iron oxide is used as a material for ferrites impaired magnetic properties will result in the case of hard ferrite, while the production of manganese ferrite involves difficulties in determining the proportions of the ingredients, with the result that the starting material seriously deteriorates the commercial value of the products.

For the reasons given above, ferrous salts having a high manganese content are usable only for limited applications and are even dumped into the ocean if seldom, causing water pollution.

Secondly, typical of the wet processes heretofore adopted for producing spinel-type iron oxide is a process in which an alkali is reacted with an aqueous solution of ferrous salts and the resulting ferrous hydroxide is oxidized in a strongly alkaline aqueous solution with air or like oxidative gas introduced into the solution as disclosed in Japanese Pat. Pub. No. 668/1969. According to this process, the $Fe^{2+}$ concentration of the aqueous reaction solution is limited to about 0.7 mol/l if highest and is usually at a lower level. Thus the $Fe^{2+}$ concentration is much lower than that in the process of this invention to be described later which is 1.0 to 2.0 mols/l. The upper limit (0.7 mol/l) of $Fe^{2+}$ concentration is critical to the conventional process because during the reaction between the ferrous hydroxide formed and aqueous solution of ferrous salts or as the oxidation reaction of ferrous hydroxide proceeds, the aqueous reaction solution tends to gel or exhibit increasing consistency, and this tendency inevitably becomes pronounced as the concentration of $Fe^{2+}$ increases, making it difficult to permit the oxidative gas to act effectively. The low $Fe^{2+}$ concentration required further entails difficulties in improving the operation efficiency. In addition, since the pH value of the aqueous solution to be reacted in the conventional process is at least 10 which is much higher than the pH value of 5 to 6 employed for the process of this invention to be set forth below, the aqueous solution obtained after iron oxide precipitate has been separated from the reaction mixture by filtration is strongly alkaline. However, it is not economical to recover sodium or like basic salts from the aqueous solution because they are dissolved therein in low concentrations, whereas if disposed of as it is, the solution will cause pollution.

Besides the generally practiced process described above, an attempt has been made to obtain spinel-type iron oxide $Fe_3O_4$ by a special process in which a gaseous oxidative agent is continuously forced into an aqueous solution of ferrous salts having a pH of 4 to 5 and maintained at a high pressure of 4 to 10 kg/cm² and at a high temperature of 140° to 180°C (Japanese Pat. No. 13456/1962), but this process requires a special equipment and is therefore unsuitable to produce spinel-type iron oxide inexpensively.

As will be apparent from above, the known process for producing iron oxide products from waste liquid from titanium dioxide manufacturing process, pickling liquor and like waste liquid containing ferrous salts give rise to incidental pollution problems, are very low in operation efficiency and require an enormous equipment investment, consequently increasing the cost of iron oxide products obtained. Moreover, due to the difficulties usually encountered in removing manganese compounds from the starting material in which they are inevitably contained as impurities these compounds remain in the end product, making it impossible to obtain high-quality products. These drawbacks render the conventional processes by no means feasible as processes for manufacturing iron oxide products which are also useful in purifying the waste liquids.

SUMMARY OF THE INVENTION

Accordingly, an object of this invention is to provide novel processes for producing commercially valuable iron oxide products from waste liquids containing ferrous salts with high efficiency and at a low cost.

Another object of this invention is to provide economically advantageous processes for purifying the above-mentioned waste liquids.

Another object of this invention is to provide processes by which iron oxide products, especially spinel-type iron oxide, alpha-$Fe_2O_3$ and gamma-$Fe_2O_3$, which are in the form of particulate crystals, uniform in quality and free from manganese compounds as impurities, can be produced efficiently, inexpensively and without entailing pollution.

Other objects of this invention will become more apparent from the following description. The term "iron oxide products" herein used refers to so-called magnetite or black iron oxide, i.e. iron oxide of spinel structure ($FeO_x \cdot Fe_2O_3$ wherein $0 < x \leq 1$), red iron oxide (alpha-$Fe_2O_3$) and brown iron oxide (gamma-$Fe_2O_3$).

The foregoing and other objects of this invention will be accomplished by the processes of this invention which are summarized below.

The process of this invention for producing an iron oxide product comprises the steps of preparing a starting solution having a $Fe^{2+}$ concentration of 1 to 2 mols/l from a waste liquid containing ferrous salts and manganese compounds as impurities; adding an alkali to the solution to suspend 5 to 30 mol % of $Fe^{2+}$ in the solution as ferrous precipitate and to thereby obtained a suspension; introducing an oxidative gas into the suspension as maintained at a temperature of 60 to 90°C and fully agitated while continuously adding an alkali to the suspension so as to always maintain the pH of the suspension at a desired value in the range of 5 to 6 with a tolerance of ± 0.05, to thereby form particles of spinel-type iron oxide ($FeO_x \cdot Fe_2O_3$ wherein $0 < x \leq 1$) having a uniform quality; and suspending the particles of spinel-type iron oxide in an aqueous solution having a pH of 3.5 to 5.0 as adjusted with sulfuric acid or nonoxidative inorganic acid to solubilize polyvalent manganese contained in the particles of spinel-type iron oxide, subsequently separating the particles of spinel-type iron oxide from the suspension by filtration, washing the particles with water and drying the same to obtain particles of spinel-type iron oxide having a low manganese content.

The process of this invention for purifying a waste liquid containing ferrous salts comprises the steps of removing iron compounds from the waste liquid as a high-quality iron oxide product by preparing a starting solution having a $Fe^{2+}$ concentration of 1 to 2 mols/l from a waste liquid containing ferrous salts and manganese compounds as impurities; adding an alkali to the solution to suspend 5 to 30 mol % of $Fe^{2+}$ in the solution as a ferrous precipitate and to thereby obtain a suspension; introducing an oxidative gas into the suspension as maintained at a temperature of 60° to 90°C and fully agitated while continuously adding an alkali to the suspension so as to always maintain the pH of the suspension at a desired value in the range of 5 to 6 with a tolerance of ± 0.05, to thereby form particles of spinel-type iron oxide ($FeO_x \cdot Fe_2O_3$ wherein $0 < x \leq 1$) having a uniform quality; and suspending the particles of spinel-type iron oxide in an aqueous solution having a pH of 3.5 to 5.0 as adjusted with sulfuric acid or nonoxidative inorganic acid to solubilize polyvalent manganese contained in the particles of spinel-type iron oxide, subsequently separating the particles of spinel-type iron oxide from the suspension by filtration, washing the particles with water and drying the same to obtain particles of spinel-type iron oxide having a low manganese content.

DETAILED DESCRIPTION

Figure 1:
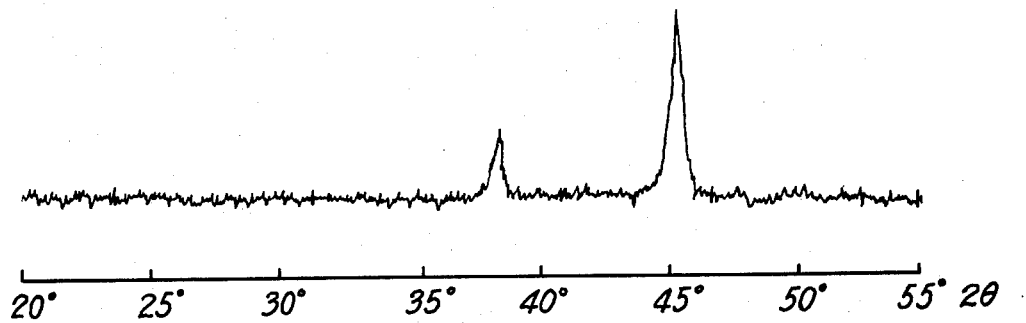
FIG. 1 is an X-ray diffractiometric diagram showing a precipitate of spinel-type iron oxide produced according to a process of this invention (Example 1)

For many years past, we have conducted researches on processes for efficiently inexpensively manufacturing commercially-valuable iron oxide products from waste liquid discharged from process for producing titanium dioxide and containing ferrous salts, pickling liquor containing ferrous salts and like industrial waste liquids containing ferrous salts. The processes are not only intended to produce iron oxide products but are also useful for economically advantageously purifying harmful waste liquids by removing high iron contents therefrom.

However, it has been impossible to fulfil the objects of this invention by conventional processes for manufacturing iron oxide products because they are low in operation efficiency, require expensive equipments, entail discharge of a detrimental waste liquid in one form or another and have various other deficiencies.

It is especially noted that waste liquids containing ferrous salts which are readily available as starting materials contain manganese compounds which are difficult to remove by conventional methods, with the result that iron oxide products obtained by conventional processes invariably contain manganese compounds, which seriously lower the commerical value of the iron oxide products obtained.

Under the foregoing situations in the art, we have carried out researches for years to provide a process for producing spinel-type iron oxide in which reaction can be conducted at a high $Fe^{2+}$ concentration of 1.0 to 2.0 mols/l within a short period of time so that the operation can be effected with high efficiency without involving difficulties in the treatment of the waste water resulting from the reaction in order to obtain inexpensive spinel-type iron oxide composed of particles having sizes suitable for pigment, ferrite, magnetic recording materials, etc. and free of irregularities to be otherwise caused by variations of pH during reaction.

According to generally practiced processes, for example, the aforesaid process of Japanese Pat. No. 668/1969, we attempted to conduct reaction at a high $Fe^{2+}$ concentration of 1.0 to 2.0 mols/l to produce spinel-type iron oxide alone within a short period of time, with the result that the aqueous reaction solution gelled and became increasingly consistent with the increase in the concentration of $Fe^{2+}$ in the solution, making it difficult to allow a gaseous oxidizing agent to act effectively. Consequently the reaction took a very long period of time and it was impossible to obtain only spinel-type iron oxide of a uniform quality at $Fe^{2+}$ concentration of 1.0 to 2.0 mols/l as in the case of this invention.

As a result of our researches, we focused our attention on the reaction mechanism to be described later as a method for forming spinel-type iron oxide of uniform quality within a short time at a high $Fe^{2+}$ concentration of 1.0 to 2.0 mols/l, further realizing that spinel-type iron oxide is produced at a pH of 5 to 6. However, if it is attempted to control the pH of aqueous reaction solution to a desired value in the range of 5 to 6, it is impossible to control the pH value with a tolerance of ± 0.05. If the pH value is not adjusted to a value between 5 and 6 with a tolerance of ± 0.05, the resulting particles invariably involve a wide distribution of their sizes, even if the reaction is completed in the pH range of from 5 to 6.

Accordingly we found that the pH value can be adjusted to the above-mentioned range with a tolerance of ± 0.05 by preparing an aqueous solution of ferrous salts to be reacted which contains a ferrous precipitate composed of 5 to 30 mol % of $Fe^{2+}$ based on the total amount of $Fe^{2+}$ in the solution and thereafter continuously adding an alkali to the aqueous solution so as to always maintain the pH of the solution at a desired value in the range of 5 to 6 with a tolerance of ± 0.05, whereby spinel-type iron oxide is available which has a stable and uniform particle size distribution.

We have also conducted researches on processes for preparing iron oxide products free from manganese compounds as impurities.

In view of the fact that manganese oxides as impurities are inevitably contained in the product obtained from waste liquid from titanium dioxide manufacturing process or waste liquid from sheet steel pickling process or in the product obtained from ferrous salts prepared from such waste liquid, we found a process for removing or reducing the amount of manganese oxides in the product, namely spinel-type iron oxide, while the iron oxide is precipitated in the reaction solution or when the iron oxide is converted to red iron oxide by roasting.

Based on these findings, we have accomplished the processes of this invention briefly described above.

The steps of the present processes will be described below in greater detail.

The aqueous solution of ferrous salts to be reacted according to this invention is prepared from waste liquid containing ferrous salts and discharged from titanium dioxide manufacturing process, pickling liquor containing ferrous salts, solution containing as dissolved therein ferrous salts such as ferrous sulfate heptahydrate ($FeSO_4 \cdot 7H_2O$) prepared from such waste liquid or like waste liquid of solution. These waste liquids and the ferrous salts prepared therefrom all contain manganese compounds as impurities which are difficult to remove by a usual method. Other impurities which differ in accordance with the kind of waste liquid are readily removable in usual manner as already known. Accordingly, the solution to be reacted by the present process is made free of other impurities by pretreatment and contains only manganese compounds as main objectionable impurities.

The process of this invention comprises a series of the following steps:

a. The step of preparing the solution to be reacted from a waste liquid containing ferrous salts and manganese compounds as impurities, the solution having a $Fe^{2+}$ concentration of 1 to 2 mols/l.

b. The step of preparing a suspension by adding an alkali to the solution to suspend 5 to 30 mol % of $Fe^{2+}$ in the solution as a ferrous precipitate.

c. The step of forming spinel-type iron oxide by introducing an oxidative gas into the supension as it is maintained at a temperature of 60° to 90°C and fully agitated while continuously adding an alkali to the suspension so as to always maintain the pH of the suspension at a desired value in the range of 5 to 6 with a tolerance of ± 0.05, to thereby form particles of spinel-type iron oxide ($FeO_x \cdot Fe_2O_3$ wherein $0 < x \leq 1$) having a uniform quality.

d. The step of removing the manganese compounds by suspending the particles of spinel-type iron oxide in an aqueous solution having a pH of 3.5 to 5.0 as adjusted with sulfuric acid or nonoxidative inorganic acid to solubilize polyvalent manganese contained in the particles of spinel-type iron oxide, subsequently separating the particles of spinel-type iron oxide from the suspension by filtration, washing the particles with water and drying the same to obtain particles of spinel-type iron oxide having a low manganese content.

The spinel-type iron oxide obtained by the series of steps (a) to (d) is further subjected to heat treatment to obtain alpha-$Fe_2O_3$ and gamma-$Fe_2O_3$ as stated below:

e. The step of forming alpha-$Fe_2O_3$ by roasting the spinel-type iron oxide obtained from the series of steps (a) to (d) at a temperature of at least 450°C.

f. The step of forming brown red iron oxide (gamma-$Fe_2O_3$) by roasting the spinel-type iron oxide from the series of steps a) to d) at a temperature of up to 300°C.

The present invention further provides a process for producing red iron oxide (alpha-$Fe_2O_3$) having a very low manganese content from the spinel-type iron oxide prepared from the series of steps (a) to (d).

The process of this invention is characterized by the step (g) of mixing with the spinel-type iron oxide from the series of steps (a) to (d) sulfuric acid or sulfate which gives a noncoloring substance when decomposed at a temperature of below 850°C in an amount, calculated as the weight of sulfuric acid radicals of at least three times the amount, calculated as the weight of MnO, of manganese oxides contained in the spinel-type iron oxide, and roasting the mixture at a temperature of 450° to 850°C.

The combination of the steps given above provides a process according to this invention for producing the desired kind of iron oxide product. For example:

A. Process for producing spinel-type iron oxide comprises the series of steps (a) to (d).

B. Process for producing red iron oxide (alpha-$Fe_2O_3$) comprises the series of steps (a) to (d) and step (e).

C. Process for producing gamma-$Fe_2O_3$ comprises the series of steps (a) to (d) and step (f).

D. Process for producing red iron oxide (alpha-$Fe_2O_3$) having a very low manganese content comprises the series of steps (a) to (d) and step (g).

The reaction procedures and reaction conditions of the processes of this invention will be described below in greater detail.

The reaction mechanism of this invention for forming spinel-type iron oxide is as follows.

When an alkali is added to the solution to be reacted containing ferrous salts and usually having a pH of about 2 to continuously vary the pH value thereof from 2 to 7 while heating the solution at 60° to 90°C and introducing air or like oxidative gas into the solution, spinel-type iron oxide is produced at the pH value of the solution of 5 to 6. Presumably this is attributable to the following phenomena: The ferrous ions ($Fe^{2+}$) in the aqueous solution are oxidized to ferric ions ($Fe^{3+}$) as the oxidizing gas becomes progressively dissolved and diffused into the aqueous solution, with the result that the aqueous solution is made to contain both ferrous ions ($Fe^{2+}$) and ferric ions ($Fe^{3+}$). When the aqueous solution has a temperature of 60° to 90°C and pH of 5 to 6, ferrous ions ($Fe^{2+}$) and ferric ions ($Fe^{3+}$) undergo coprecipitation reaction to form spinel-type iron oxide composed of bivalent iron, trivalent iron and oxygen.

Thus it is thought that the coprecipitation reaction between ferrous ions, $Fe^{2+}$, and ferric ions, $Fe^{3+}$, involved in the present process makes it possible to produce a precipitate of spinel-type iron oxide within a short period of time without rendering the aqueous reaction solution consistent, notwithstanding that thw solution has a high $Fe^{2+}$ concentration of 1.0 to 2.0 mols/l.

This reaction mechanism is entirely distinct from the conventional process for producing spinel-type iron oxide in which ferrous hydroxide is oxidized in an aqueous alkaline solution with an oxidative gas introduced into the solution.

When coprecipitation reaction starts to take place between ferrous ions ($Fe^{2+}$) and ferric ions ($Fe^{3+}$), the hydrogen ion concentration ($H^+$) of the aqueous solution increases to reduce the pH value of the aqueous solution, initiating formation of water-containing ferric hydroxide ($\alpha$-FeOOH) in addition to spinel-type iron oxide at a pH value of not higher than 4.9. For this reason, the aqueous solution of iron oxides is maintained at an adjusted pH of 5 to 6 by adding sodium hydroxide, ammonia or like alkali to adjust the hydrogen ion concentration of the aqueous solution.

However, it is impossible to obtain a precipitate of spinel-type iron oxide which is uniform in particle size distribution merely by adjusting the pH of the aqueous solution of ferrous salts to 5 to 6 with the addition of alkali, presumably because at the very initial stage of coprecipitation reaction before the pH value reaches 5 to 6, ferrous ions ($Fe^{2+}$) are oxidized to ferric ions ($Fe^{3+}$), which independently precipitate to give water-containing ferric hydroxide ($\alpha$-FeOOH) and further because the pH value of the reaction solution is apt to vary and unstable. Accordingly before the coprecipitation reaction takes place between ferrous ions ($Fe^{2+}$) and ferric ions ($Fe^{3+}$), 5 to 30 mol % of the total amount of $Fe^{2+}$ in the aqueous solution of ferrous salts to be reacted are precipitated, and the resulting suspension is reacted so as to obtain the desired product composed only of spinel-type iron oxide of uniform particle size distribution.

For the reasons given above, therefore, an alkali is added to the aqueous solution of ferrous salts according to this invention to suspend 5 to 30 mol % of the total amount of $Fe^{2+}$ in the solution as a ferrous precipitate, the total $Fe^{2+}$ concentration of the resulting suspension to be reacted being 1.0 to 2.0 mols/l.

Subsequently, an oxidative gas is introduced into the suspension maintained at a temperature of 60° to 90°C and fully agitated while continuously adding an alkali to the suspension so as to always maintain the pH of the suspension at a desired value in the range of 5 to 6 with a tolerance of ± 0.05, to thereby form spinel-type iron oxide having a uniform quality.

When the aqueous solution of ferrous salts to be reacted contains a ferrous precipitate composed of 5 to 30 mol % of $Fe^{2+}$ based on the total amount of $Fe^{2+}$ in the solution, the pH value of the solution can be adjusted very accurately with a tolerance of ± 0.05, presumably because the hydrogen ion concentration ($H^+$) which increases as the coprecipitation reaction proceeds can be controlled by the ferrous ions ($Fe^{2+}$) released from the ferrous precipitate and dissolved out into the solution again.

The ferrous ions ($Fe^{2+}$) thus dissolved out again are subjected to reaction, with the result that the ferrous precipitate contained in the aqueous solution of ferrous salts before coprecipitation reaction between $Fe^{2+}$ and $Fe^{3+}$ is eventually eliminated.

As already described, the aqueous solution of ferrous salts to be reacted is previously made to contain a ferrous precipitate so as to render the pH of the solution accurately adjustable from the very initial stage of coprecipitation reaction, thereby making it possible to stably obtain spinel-type iron oxide of a uniform quality which is composed of sizes suitable for pigment, ferrite, magnetic recording material, etc.

Usable as the starting aqueous solution of ferrous salts to be reacted according to the present invention are waste liquids containing ferrous salts and discharged from titanium dioxide manufacturing process and from process for pickling sheet steel and like waste liquids. Also employable are solutions containing as dissolved therein ferrous salts such as ferrous sulfate heptahydrate ($FeSO_4 \cdot 7H_2O$).

The reaction conditions for producing spinel-type iron oxide according to this invention are determined for the following reasons.

(1) If the $Fe^{2+}$ concentration of the solution to be reacted is 0.9 mol/l or lower, water-containing ferric hydroxide (a-FeOOH) is present cojointly with spinel-type iron oxide, whereas if it is 2.1 mols/l or higher, it becomes very difficult to dissolve ferrous salts serving as starting materials. Thus the concentration of $Fe^{2+}$ in the reaction solution is preferably in the range of 1 to 2 mols/l.

2. If the pH value of the solution to be reacted is not higher than 4.9, water-containing ferric hydroxide ($\alpha$-FeOOH) is present cojointly with spinel-type iron oxide, whilst if it is 6.1 or higher, hydroxo ferrous complex salt will be formed, rendering the solution glutionous. Furthermore, solutions having a pH of 2 to 3.5 fail to permit formation of the iron precipitate. Thus the pH must be controlled to 5 to 6 to effect satisfactory reaction.

3. When the amount of ferrous ions to be precipitated as ferrous precipitate before the pH value of the solution is controlled to the range of 5 to 6 is not more than 4.9 mol % great difficulties are encountered in stably controlling the pH value at the initial stage of reaction, readily permitting the presence of water-containing ferric hydroxide ($\alpha$-FeOOH). If it is not lower than 30.1 mol %, the solution becomes viscous, entailing difficulties in uniformly introducing the oxidative gas into the solution and making it impossible to obtain deposition of spinel-type iron oxide as contemplated by this invention although the pH value is controllable. It therefore follows that the amount of ferrous precipitate to be previously produced in the solution of ferrous salts should be 5 to 30 mol % in terms of the amount of $Fe^{2+}$ based on the total amount of $Fe^{2+}$.

Furthermore unless the pH value is controlled to a value in the range of 5 to 6 with a tolerance of $\pm 0.05$, it is impossible to assure uniform particle size distribution within a narrow range.

4. The reaction temperature must be in the range of 60° to 90°C, because temperature of 59°C or lower permit formation of water-containing ferric hydroxide ($\alpha$-FeOOH), whereas reaction temperatures of 91°C or higher require a special equipment which renders the process industrially infeasible, failing to fulfil the objects of this invention.

In brief, these conditions when satisfied ensure production of spinel-type iron oxide of a uniform quality which are composed of particles of sizes suitable for pigment, ferrite and magnetic recording materials as intended by the present invention.

Now given below are procedures and reaction conditions of step d) for removing manganese (polyvalent manganese) from spinel-type iron oxide according to this invention.

Spinel-type iron oxide is suspended in an aqueous solution which is adjusted to a pH of 3.5 to 5.0 with sulfuric acid, hydrochloric acid or like inorganic acid having no oxidative properties. This pH range is critical to this invention; at pH values higher than 5.0 the iron oxide does not dissolve and fails to liberate ferrous ions, whereas if the pH is lower than 3.5, the iron oxide will dissolve in a greater amount than is necessary and may possibly dissolve wholly.

The mechanism for removing manganese in step (d) is such that spinel-type iron oxide is dissolved with a nonoxidative inorganic acid, permitting $Fe^{2+}$ to dissolve out, and the ferrous ions reduce polyvalent manganese to soluble bivalent manganese ($Mn^{2+}$) which are removable by washing with water.

The solution used for this purpose is maintained at the above-specified pH, and the temperature and time suitable for solubilization are determined in accordance with the amount of manganese contained in the spinel-type iron oxide. When the manganese content has reduced to less than 0.2% calculated as MnO, the iron oxide is filtered off from the solution, washed with water and then dried, whereby powdery spinel-type iron oxide is available which is low in manganese content.

The solutions having an adjusted pH of 3.5 to 5.0 to be used according to this invention include a solution prepared by adding sulfuric acid or nonoxidative inorganic acid to the solution obtained from the wet process immediately after completion of oxidation with air and an aqueous solution prepared by adding sulfuric acid or nonoxidative inorganic acid to water. The former is the case in which polyvalent manganese is continuously solubilized during the process for producing spinel-type iron oxide, whilst the latter is the case in which powdery spinel-type iron oxide is first prepared and is then subjected to the step to solubilize polyvalent manganese. It is well known that sulfuric acid, although highly oxidative in itself, is rendered no longer oxidative when formulated into an aqueous solution of pH 3.5 to 5.0 as diluted to 100-fold.

Described below in detail are reaction mechanism and reaction conditions of step (g) for producing red iron oxide (alpha-$Fe_2O_3$) having an extremely low manganese content. According to step (g), the spinel-type iron oxide obtained from the series of steps (a) to (d) is used as a starting material, with which sulfuric acid or sulfate which gives a noncoloring substance when decomposed at a temperature of below 850°C is mixed in an amount, calculated as the weight of sulfuric acid groups, of at least three times the amount, calculated as the weight of MnO, of manganese oxides contained in the spinel-type iron oxide, and the resulting mixture is roasted at a temperature of 450° to 850°C to prepare red iron oxide (alpha-$Fe_2O_3$) suitable for use as a pigment.

According to the conventional dry process as already stated, manganese is contained in ferrous sulfate in the form of sulfate, so that when ferrous sulfate is roasted at a relatively low temperature, the manganese sulfate remains as such in the roasted product without undergoing decomposition. When the product is subsequently washed with water, the manganese component is dissolved in water for removal.

According to the wet process, on the other hand, manganese is contained in spinel-type iron oxide as coprecipitated in the form of manganese oxides, this making it impossible to remove manganese by washing with water after roasting. When the iron oxide is roasted, the manganese oxides react with iron oxide to yield manganese ferrite, thereby seriously failing to give a vivid color.

Accordingly, sulfuric acid or sulfate which is capable of giving a noncoloring substance when decomposed at a temperature of below 850°C which is the decomposition temperature of manganese sulfate is added to and mixed with the iron oxide, and the mixture is then roasted at a temperature below the decomposition temperature of manganese sulfate, whereby the manganese oxides are subjected to decomposition reaction and converted to manganese sulfate which is readily removable by washing with water. This enables the resulting product to exhibit a vivid color, making it sure to obtain particles which are less liable to flocculation.

The mechanism in which the manganese sulfate referred to above is formed will be described in detail. The sulfuric acid or sulfate used, when heated, is thermally decomposed to give off sulfuric anhydride gas, which reacts with the spinel-type iron oxide and manganese oxides, producing manganese sulfate and a portion of iron sulfate. The iron sulfate, when decomposed, further produces sulfuric anhydride gas, which also reacts with unreacted manganese oxides to yield manganese sulfate. Thus when the above-mentioned mixture is roasted at a temperature lower than the decomposition temperature of manganese sulfate, the manganese oxides are totally converted to water-soluble manganese sulfate which is readily removable by washing with water. Moreover, since the growth of particles of iron oxide takes place in the atmosphere of sulfuric anhydride gas, the powdery iron oxide obtained includes particles which are less susceptible to flocculation and have uniform sizes owing to the same mechanism as in the dry process.

The mechanism described improves the properties (such as color, coloring ability, bulk density, oil absorbing ability, oil absorption, hiding power and dispersibility) of the red iron oxide powder which is obtained when spinel-type iron oxide is roasted as it is, thus producing an excellent product for use as a pigment.

To describe the sulfate which is used in step (g) and is decomposable at below 850°c to give a noncoloring substance, examples thereof are ammonium sulfate, iron sulfate, aluminum sulfate, etc. Calculated in terms of the weight of sulfuric acid radicals, the sulfuric acid or sulfate to be employed in step (g) is used in an amount corresponding to at least three times the amount of the manganese oxides contained in spinel-type iron oxide serving as the starting material, the latter amount being in weight calculated as MnO. Although is is sufficient that the amount of the former be at least equivalent to the latter if it is desired to merely convert the manganese oxides to sulfate, the former amount must be at least three times the latter in order to assure efficient conversion to manganese sulfate and uniform growth of particles of the iron oxide with reduced flocculation. Although the upper limit of amount of sulfuric acid or sulfate is not particularly defined, an excess amount is of course undesirable in view of economy. Sulfates which decompose at temperatures of 850°C or higher or those meltable without undergoing decomposition are unfit for use, since they fail to react with manganese oxides and to form manganese sulfate. Furthermore, sulfates which yield a coloring substance when decomposed are unable to allow the product to exhibit a vivid color and are therefore not usable. The above-mentioned additive may be mixed with spinel-type iron oxide as it is dissolved in water or in the form of powder.

If the roasting step is conducted at a temperature of less than 450°C, iron sulfate will give a reduced amount of sulfuric anhydride gas, without allowing the additive to act effectively, whereas roasting temperatures not lower than 850°C permit decomposition of manganese sulfate into an insoluble manganese oxide, resulting in a dull color. Therefore, the roasting temperature is determined in the range of 450° to 850°C in accordance with the color desired.

The processes of this invention have the following advantages for industrial operation.

1. The present processes are very economical to practice in industries. For example, although the reaction is conducted at a very high $Fe^{2+}$ concentration of 1.0 to 2.0 mols/l, it is completed within an extremely short period of time, i.e. within about 30 to 150 minutes. Thus the processes achieve high equipment efficiency. Moreover, the ferrous iron $Fe^{2+}$ in the aqueous solution of ferrous salts used as a starting material can be completely recovered, while the amount of alkali needed for neutralization is 1 equivalent to the acid radicals in the waste liquid. The present processes are therefore epoch-making in these respects. The solution resulting from the reaction is substantially neutral, and neutral salts such as $Na_2SO_4$, etc. which are dissolved therein at high concentrations, at least, in equimolar relation (1.0 to 2.0 mols/l) to $Fe^{2+}$ can be recovered efficiently by crystallization from the filtrate separated frm the precipitate formed. The neutral salts such as given above are industrially useful as well known.

2. The products available by the pesent processes are characterized by being composed of particles involving a uniform particle size distribution and containing not more than 0.2% calculated as the weight MNO as impurities. Because of these characteristics, the products are useful for a wide variety of applications as stated below.
   1. The spinel-type iron oxide obtained as a product is composed of fine particles about $0.1\mu$ in size and has magnetic characteristics useful as a magnetic recording material.
   2. The spinel-type iron oxide, which has an excellent black color as it is, is advantageous as a material for various coloring pigments, printing inks and magnetic inks.
   3. The brown fine particles of gama-$Fe_2O_3$ (up to $0.1\mu$ in size) obtained oy oxidizing the spinel-type iron oxide at a temperature of not higher than 300°C are similarly useful as stated in the paragrahs (1) and (2) above.
   4. The vivid red fine particles of alpha-$Fe_2O_3$ (0.1 to $1.0\mu$ in size) obtained by heating the spinel-type iron oxide at a temperature in higher than 450°C have good dispersibility and exhibit a uniform red color for use as a coloring iron oxide pigment. The iron oxide is also serviceable as an iron oxide material which has excellent magnetic properties for the production of ferrite.
   5. The products are usable as materials for manufacturing fine metal iron particles for powder metallurgical applications.

3. The present processes have high social or public usefulness.

For example, since the by-products in the reaction mixture can be recovered economically and the resulting waste water is substantially neutral, the processes will not cause any pollution.

It is noted that the waste liquids containing ferrous salts and discharged from process for pickling iron and steel materials and from process for producing titanium dioxide cause pollution, for the abatement of which studies have long been made throughout the world as disclosed in U.S. Pat. No. 2,529,874, Japanese Pat. Nos. 14703/1963, 24351/1963 and 24770/1968.

When considered as measures for treating waste liquids, the present processes which are applicable to a solution of high $Fe^{2+}$ concentration for reaction are highly useful since aforementioned waste liquids can be treated directly by the processes.

The processes of this invention will be described below with reference to examples.

EXAMPLE 1

Into a 50-liter reactor equipped with a stirrer and a pH meter was placed 14.3 l of a waste liquid (starting solution) having the composition given below and discharged from process for producing titanium dioxide, to which 5.7l of 3.42N NaOH was added to form an iron precipitate composed of about 10 mol % of iron ions based on the total amount of $Fe^{2+}$. Subsequently while maintaining the resulting solution (suspension) containing the iron precipitate at 80°C and fully stirring the solution, air was introduced thereinto at a rate of 150l/min. At the same time, 18N NaOH was continuously added to the solution to maintain its pH value at 5.8 ± 0.05 as determined by the pH meter. This procedure was continued for 180 minutes to form a back precipitate of spinel-type iron oxide.

Figure 2:
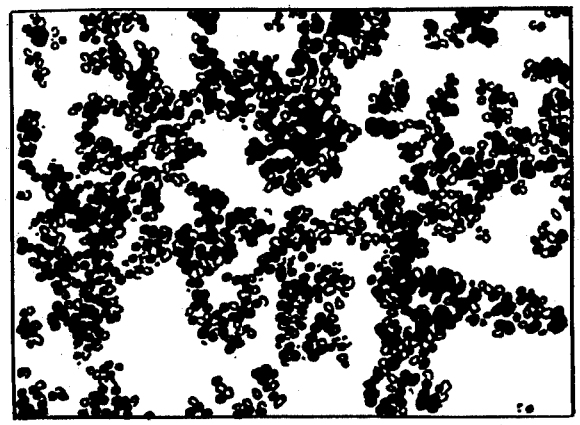
FIG. 2 is an electron photomicrograph taken at a magnification of 20,000X to show the particles of the same.

While maintaining the solution containing the black precipitate at 60°C and wholly but gently stirring the same, sulfuric acid was then added, in small amounts, to the solution to maintain the pH thereof at 4.0. After this procedure was followed for 3 hours, the reaction mixture gave a black precipitate in a amount of 152 g per liter of the starting waste liquid. The black precipitate was washed with water, filtered off and dried at 80°C to obtain powder (containing 0.12% by weight of manganese oxides, calculated as MnO), namely particles which were found to be 0.13 $\mu$ in mean size by BET method. The X-ray diffractiometric diagram shown in FIG. 1 revealed that the black powder was composed only of spinel-type iron oxide. FIG. 2 is an electron photomicrograph showing the same powder at 20,000X.

The black powder was heated in air at 300°C to obtain brown-colored gamma-ferric oxide. Further when the black powder was heated at 700°C, alpha-ferric oxide was obtained which has a vivid red color.

On the other hand, the reaction mixture from which the black precipitate was separated off yielded about 340 g of anhydrous sodium sulfat per liter of the starting waste liquid.

| Composition of the Waste Liquid | | |
|---|---|---|
| $Fe^{2+}$: | 156.0 | g/l |
| $Fe^{3+}$: | 0.78 | " |
| $Mn^{2+}$: | 1.72 | " |
| $Mg^{2+}$: | 1.17 | " |
| $Na^+$: | 0.83 | " |
| $TiO_2$: | 0.113 | " |
| $Al_2O_3$: | 2.53 | " |
| $SiO_2$: | 0.57 | " |
| $H_2SO_4$: | 40.7 | " |

EXAMPLE 2

A purified supernatant (starting solution) having the composition given below was prepared by adding 18N NaOH to a waste liquid having the same composition as in Example 1, in an amount of 195 ml per liter of the waste liquid, introducing air into the waste liquid and leaving the waste liquid to stand for cooling. To 13.5l of the supernatant was added 6.5l of 1.85N NaOH solution to form an iron precipitate composed of about 20 mol % of $Fe^{2+}$ ions based on the total amount of $Fe^{2+}$. Subsequently while maintaining the resulting solution (suspension) containing the iron precipitate at 65°C and fully stirring the solution, air was introduced thereinto at a rate of 150 l/min. At the same time, 18N NaOH was continuously added to the solution to maintain its pH value at 5.5 ± 0.05 as determined by the pH meter. This procedure was continued for 150 minutes to form a black precipitate of spinel-type iron oxide.

While maintaining the solution containing the black precipitate at 60°C and wholly but gently stirring the same, 98 % sulfuric acid was then added, in small amounts, to the solution to maintain the pH thereof at 3.5. After this procedure was followed for 30 minutes, the reacton mixture gave a black precipitate in an amount of 115 g per liter of the starting supernatant. The black precipitate was washed with water, filtered off and dried at 80°C to obtain powder, namely particles which were found to be 0.08 $\mu$ in mean size by BET method. The result X-ray diffractiometry revealed that the black powder was composed only of spinel-type iron oxide as in Example 1.

The black powder was heated in air at 300°C to obtain brown-colored gamma-ferric oxide. Further when the black powder was heated at 700°C, alpha-ferric oxide was obtained which had a vivid red color.

On the other hand, the reaction mixture from which the black precipitate was separated off yielded 213 g of anhydrous sodium sulfate per liter of the starting supernatant.

| Composition of the Supernatant | | |
|---|---|---|
| $Fe^{2+}$: | 124 | g/l |
| $Fe^{3+}$: | 1.20 | " |
| $Mn^{2+}$: | 1.70 | " |
| $Mg^{2+}$: | 0.65 | " |
| $Na^+$: | 14.4 | " |
| $TiO_2$: | 0.005 | " |
| $Al_2O_3$: | 0.024 | " |
| $SiO_2$: | 0.012 | " |
| $H_2SO_4$: | 1.06 | " |

EXAMPLE 3

The same waste liquid as in Example 1 was purified to obtain crystals of $FeSO_4 \cdot 7H_2O$ having the composition given below. Into the same reactor as used in Example 1 was placed 16.8l of 1.55 mol solution of the crystals in water (starting solution), to which 3.2l of 1.63N NaOH solution was added to form an iron precipitate composed of about 10 mol % of $Fe^{2+}$ ions based on the total amount of $Fe^{2+}$. Subsequently while maintaining the resulting solution containing the iron precipitate at 90°C and fully stirring the solution, air was introduced thereinto at a rate of 150 l/min. At the same time, 18N NaOH was continuously added to the solution to maintain its pH value at 5.8 ± 0.05 as determined by the pH meter. This procedure was continued for 100 minutes to form a black precipitate of spinel-type iron oxide.

While maintaining the solution containing the black precipitate at 60°C and wholly but gently stirring the same, 12N hydrochloric acid was then added, in small amounts, to the solution to maintain the pH thereof at 4.5. After this procedure was followed for about 1 hour, the reaction mixture gave a black precipitate in an amount of 98 g per liter of the starting solution. The black precipitate was washed with water, filtered off and dried at 80°C to obtain powder, namely particles which were found to be 0.05 $\mu$ in mean size by BET method. The result of X-ray diffractiometry revealed that the black powder was composed only of spinel-type iron oxide as in Example 1.

The black powder was heated in air at 300°C to obtain brown-colored gamma-ferric oxide. Further when the black powder was heated at 700°C, alpha-ferric oxide was obtained which had a vivid red color.

On the other hand, the reaction mixture from which the black precipitate was separated off yielded about 184 g of anhydrous sodium sulfate per liter of the starting solution.

| Composition of the $FeSO_4 \cdot 7H_2O$ Crystal | | |
|---|---|---|
| $Fe^{2+}$: | 18.95 | wt % |
| $Fe^{3+}$: | 0.22 | " |
| $Mn^{2+}$: | 0.17 | " |
| $Mg^{2+}$: | 0.24 | " |
| $Ti^{4+}$: | 0.08 | " |
| $H_2SO_4$: | 0.54 | " |

EXAMPLE 4

Into the same reactor as used in Example 1 was placed 15.2l of a waste liquid (starting solution) discharged from process for pickling sheet steel with sulfuric acid and having the composition given below, to which 4.8l of 6.95N NaOH was added to form an iron precipitate composed of about 25 mol % of $Fe^{2+}$ ions based on the total amount of $Fe^{2+}$. Subsequently while maintaining the resulting solution (suspension) containing the iron precipitate at 75°C and fully stirring the solution, air was introduced thereinto at a rate of 150 l/min. At the same time, 18N NaOH was continuously added to the solution to maintain its pH value at 5.8 ± 0.05 as determined by the pH meter. This procedure was continued for 130 minutes to form a black precipitate of spinel-type iron oxide.

While maintaining the solution containing the black precipitate at 60°C and wholly but gently stirring the same, 98% sulfuric acid was then added, in small amounts, to the solution to maintain the pH thereof at 4.5. After this procedure was followed for about 3 hours, the reacton mixture gave a black precipitate in an amount of 96 g per liter of the starting waste liquid. The black precipitate was washed with water, filtered off and dried at 80°C to obtain powder, namely particles which were found to be 0.05μ in mean size by BET method. The result of X-ray diffractiometry revealed that the black powder was composed only of spinel-type iron oxide as in Example 1.

The black powder was heated in air at 300°C to obtain brown-colored gamma-ferric oxide. Further when the black powder was heated at 700°C, alpha-ferric oxide was obtained which had a vivid red color.

On the other hand, the reaction mixture from which the black precipitate was separated off yielded about 257 g of anhydrous sodium sulfate per liter of the starting waste liquid.

| Composition of the Waste Liquid | | |
|---|---|---|
| $Fe^{2+}$: | 96 | g/l |
| $Fe^{3+}$: | 1.50 | " |
| $Mn^{2+}$: | 1.62 | " |
| $Mg^{2+}$: | 0.03 | " |
| $H_2SO_4$: | 62.5 | " |

EXAMPLE 5

Into the same reactor as used in Example 1 was placed 17.54l of a waste liquid discharged from process for pickling sheet steel with sulfuric acid and having the same composition as in Example 4, to which 2.45l of 13.26N $NH_4OH$ was added to form an iron precipitate composed of about 15 mol % of $Fe^{2+}$ ions based on the total amount of $Fe^{2+}$. Subsequently while maintaining the resulting solution (suspension) containing the ion precipitate at 80°C and fully stirring the solution, air was introduced thereinto at a rate of 150 l/min. At the same time, ammonia gas was continuously forced into the solution to maintain its pH value at 5.3 ± 0.05 as determined by the pH meter. This procedure was continued for 150 minutes to form a black precipitate of spinel-type iron oxide.

While maintaining the solution containing the black precipitate at 60°C and wholly but gently stirring the same, 98% sulfuric acid was then added, in small amounts, to the solution to maintain the pH thereof at 4.5. After this procedure was followed for 2.5 hours, the reaction mixture gave a black precipitate in an amount of 113 g per liter of the starting waste liquid. The black precipitate was washed with water, filtered off and dried at 80°C to obtain powder, namely particles which were found to be 0.10μ in mean size by BET method. The result of X-ray diffractiometry revealed that the black powder was composed only of spinel-type iron oxide as in Example 1.

The black powder was heated in air at 300°C to obtain brown-colored gamma-ferric oxide. Further when the black powder was heated at 700°C, alpha-ferric oxide was obtained which had a vivid red color.

On the other hand, the reacton mixture from which the black precipitate was separated off yielded about 272 g of ammonium sulfate per liter of the starting waste liquid.

EXAMPLE 6

Into the same reactor as used in Example 1 was placed 12.37l of a waste liquid discharged from process for pickling sheet steel with sulfuric acid and having the same composition give below, to which 7.63l of 2.63N $NH_4OH$ was added to form an iron precipitate composed of about 10 mol % $Fe^{2+}$ ions based on the total amount of $Fe^{2+}$. Subsequently while maintaining the resulting solution containing the iron precipitate at 80°C and fully stirring the solution, air was introduced thereinto at a rate of 150 l/min. At the same time, ammonia gas was continuously forced into the solution to maintain its pH value at 5.5 ± 0.05 as determined by the pH meter. This procedure was continued for 100 minutes to form a black precipitate of spinel-type iron oxide.

While maintaining the solution containing the black precipitate at 55°C and wholly but gently stirring the same, 98% sulfuric acid was then added, in small amounts, to the solution to maintain the pH thereof at 4.5. After this procedure was followed for 3 hours, the reaction mixture gave a black precipitate in an amount of 91 g per liter of the starting waste liquid. The black precipitate was washed with water, filtered off and dried at 80°C to obtain powder, namely particles which were found to be 0.08μ in mean size by BET method. The result of X-ray diffractiometry revealed that the black powder was composed only of spinel-type iron oxide as in Example 1.

The black powder was heated in air at 300°C to obtain brown-colored gamma-ferric oxide. Further when the black powder was heated at 700°C, alpha-ferric oxide was obtained which had a vivid red color.

On the other hand, the reaction mixture from which the black precipitate was separated off yielded about 265 g of ammonium chloride per liter of the starting waste liquid.

| Composition of the Waste Liquid | | |
|---|---|---|
| $Fe^{2+}$: | 108.6 | g/l |
| $Fe^{3+}$: | 1.6 | " |
| $Mn^{2+}$: | 1.67 | " |
| $Mg^{2+}$: | 0.03 | " |
| $SiO_2$: | 0.026 | " |
| HCl: | 44.9 | " |

EXAMPLE 7

Exactly under the same conditions as in Example 3, reaction was conducted to form a black precipitate of spinel-tuype iron oxide. While maintaining the solution containing the black precipitate at 60°C and wholly but gently stirring the solution, 98% sulfuric acid was thereafter added, in small amounts, to the solution to maintain the pH thereof at 4.5. After this procedure was followed for 3 hours, the black precipitate was filtered off, washed with water and dried at 80°C to obtain a black powder.

The black powder was heated in air at 300°C to prepare brown-colored gamma-ferric oxide. When the black powder was further heated at 700°C, alpha-ferric oxide was obtained which had a vivid red color.

EXAMPLE 8

Exactly under the same conditions as in Example 3, reaction was conducted to form a black precipitate of spinel-type iron oxide. While maintaining the solution containing the black precipitate at 60°C and wholly but gently stirring the solution, 98% sulfuric acid was thereafter added, in small amounts, to the solution to maintain the pH thereof at 4.5. After this procedure was followed for 3 hours, the black precipitate was filtered off, washed with water and dried at 80°C to obtain a black powder. To 50 g of the powder (containing 0.12% by weight of manganese oxides, calculated as MnO) was added 80 ml of an aqueous solution prepared by dissolving 1.5 g of $FeSO_4 \cdot 7H_2O$ (calculated as the weight of sulfuric acid radicals, the amount corresponded to about 10 times the weight of the manganese oxides, calculated as MnO) in water, and the ingredients were thoroughly mixed together to prepare a pasty mixture, which was thereafter dried at 120°C. The dried mixture was then heated in an electric oven to 750°C over a period of 2 hours and subsequently maintained at the same temperature for 1 hour. The roasted product thus obtained was crushed with ease, washed with water until no sulfate ions were detected, filtered off and dried to obtain powdery red iron oxide.

EXAMPLE 9

To 500 g of the dry powder of spinel-type ion oxide obtained in Example 1 (containing 0.12% by weight of manganese oxides, calculated as MnO) was added 400 ml of an aqueous solution prepared by dissolving 6.6 g of sulfuric acid (i.e. 6 g, calculated as the weight of sulfuric acid radicals, which corresponded to about 10 times the weight of the manganese oxides, calculated as MnO) in water, and the ingredients were thoroughly mixed together to prepare a pasty mixture, which was thereafter dried at 120°C. The dried mixture was then heated in an electric oven to 650°C over a period of 3 hours and subsequently maintained at the same temperature for 2 hours. The roasted product thus obtained was crushed with ease, washed with water until no sulfate ions were detected, filtered off and dried.

EXAMPLE 10

To 100 g of the dry powder of spinel-type iron oxide obtained in Example 2 (containing 0.12% by weight of manganese oxides, calculated as MnO) was added 80 ml of an aqueous solution prepared by dissolving 3.3 g of ammonium sulfate (i.e. 2.4 g, calculated as the weight of sulfuric acid radicals, which corresponded to about 20 times the weight of the manganese oxides, calculated as MnO) in water, and the ingredients were thoroughly mixed together to prepare a pasty mixture, which was thereafter dried at 120°C. The dried mixture was then heated in an electric oven to 700°C over a period of 2 hours and subsequently maintained at the same temperature for 1 hour. The roasted product was subsequently treated in the same manner as in Example 9 to obtain a powder of alpha-$Fe_2O_3$.

EXAMPLE 11

To 100 g of the dry powder of spinel-type iron oxide obtained in Example 4 (containing 0.18% by weight of manganese oxides, calculated as MnO) was added 80 ml of an aqueous solution prepared by dissolving 2.13 g of anhydrous aluminum sulfate (i.e. 1.8 g, calculated as the weight of sulfuric acid radicals, which corresponded to about 10 times the weight of the manganese oxides, calculated as MnO) in water, and the ingredients were thoroughly mixed together to prepare a pasty mixture, which was thereafter dried at 120°C. The dried mixture was then heated in an electric oven to 750°C over a period of 2 hours and subsequently maintained at the same temperature for 1 hour. The roasted product thus obtained was crushed with ease, washed with water until no sulfate ions were detected, filtered off and dried. The obtained product contained 0.03% by weight of MnO.

The lists to be given later show the properties of iron oxide powders thus prepared in comparison with those of iron oxide powders which were prepared in the same manner as above except that aluminum sulfate was not used.

The lists apparently indicate that the iron oxide products of this invention are extremely low in manganese oxide content, exhibiting vivid colors (the higher the L, a and b values, the higher the saturation), have improved properties in respect of coloring ability, bulkiness, oil absorption, hiding power and dispersibility which are important characteristics of iron oxides for use as pigments.

The advantages of the processes of this invention will be described below with reference to comparison examples.

COMPARISON EXAMPLE 1

In 17 l of water were dissolved 2.8 kg of ferrous sulfate crystals ($FeSO_4 \cdot 7H_2O$), and 334 ml of 18N NaOH was added to the resulting solution to form an iron precipitate composed of 30 mol. % of $Fe^{2+}$ based on the total amount of $Fe^+$ dissolved in the aqueous solution. The entire volume of the solution was then increased to 20l with addition of water to adjust the overall $Fe^{2+}$ concentration of the aqueous solution to 0.5 mol/l.

Subsequently while maintaining the solution at 80°C and introducing air thereinto at a rate of 150 l/min., 18N NaOH was continuously added to the solution to maintain its pH value at 5 as determined by a pH meter. In 30 minutes, the reaction mixture obtained gave 38 g of a black precipitate per liter of the mixture.

From the supernatant obtained from the reaction mixture, white anhydrous sodium sulfate was recovered by a conventional method in an amount of 70 g per liter of the supernatant.

The black precipitate was further washed with water, filtered off and dried at 80°C to prepare powder, which was found to be a mixture of spinel-type iron oxide and water-containing alpha-type ferric oxide ($\alpha$-FeOOH) by X-ray diffractiometric diagram.

It will be understood from this comparison example that when the $Fe^{2+}$ concentration of the starting solution is lower than 1 mol/l, the resulting product permits the presence of water-containing ferric oxide ($\alpha$-FeOOH) other than the desired product of spinel-type iron oxide.

COMPARISON EXAMPLE 2

In 17 l of water were dissolved 8.4 kg of ferrous sulfate crystals ($FeSO_4 \cdot 7H_2O$), and the solution was diluted with water to an entire volume of 20 l to adjust the overall $Fe^{2+}$ concentration of the aqueous solution to 1.5 mol/l.

Subsequently while maintaining the solution at 80°C and introducing air thereinto in the form of fine bubbles at a rate of 150 l/min., 18N NaOH was continuously added to the solution to maintain its pH value at 5 as determined by a pH meter. In 130 minutes, the reaction mixture obtained gave 115 g of a black precipitate per liter of the mixture.

The black precipitate was further washed with water, filtered off and dried at 80°C to prepare powder, which was found to be a mixture of spinel-type iron oxide and water-containing alpha-type ferric oxide by X-ray diffractiometric diagram.

It will be understood from this comparison example that unless the starting solution to be reacted is made to contain ferrous precipitate, the resulting product permits the presence of water-containing ferric oxide ($\alpha$-FeOOH) other than the desired product, namely spinel-type iron oxide.

COMPARISON EXAMPLE 3

Spinel-type iron oxide was prepared in the same manner as in Example 3 or 7 except that the step of removing manganese was not conducted.

Shown below are manganese oxide contents (calculated as MnO in terms of % by weight) of the spinel-type iron oxide powders obtained in Example 7 and Comparison Example 3.

| | |
|---|---|
| Comparison Example 3: | 0.33 |
| Example 7: | 0.12 |

COMPARISON EXAMPLE 4

The powder of Comparison Example 3 was roasted in an electric oven to 750°C over a period of 2 hours and subsequently maintained at the same temperature for one hour, washed with water, filtered off and dried to prepare red iron oxide powder (alpha-$Fe_2O_3$).

The powder of spinel-type iron oxide obtained in Example 7 was likewise treated to prepare red iron oxide powder. The properties of these powders are shown below for comparison. The manganese oxide contents are expressed in terms of % by weight, calculated as MnO.

| | Mn Content | Color | | | Coloring ability | Bulkiness (ml/g) | Oil absorption (ml/100g) | Hiding power (cm²/g) | Dispersibility ($\mu$) |
|---|---|---|---|---|---|---|---|---|---|
| | | L | a | b | | | | | |
| Comp. Ex. 4 | 0.33 | 27.0 | 31.5 | 14.0 | Poor | 3.5 | 35 | 2400 | 40 |
| Example 7 | 0.12 | 29.5 | 36.5 | 17.0 | Good | 2.8 | 30 | 2700 | 35 |
| Example 8 | 0.05 | 31.0 | 37.5 | 18.0 | Good | 2.3 | 23 | 2800 | 30 |

The L, a and b values of color were determined by a color difference meter (product of Tokyo Denshoku Co., Ltd., Japan), while coloring ability, bulkiness, oil absorption ability, hiding power and dispersibility were determined according to JIS K-5101, pigment test method.

What is claimed is:

1. A process for producing a spinel-type iron oxide powder comprising the steps of:
   preparing a starting solution having a total $Fe^{2+}$ concentration of 1 to 2 mols/l from a waste liquid containing ferrous salts and manganese compounds as impurities;
   adding an alkali to the solution to suspend 5 to 30 mole % of $Fe^{2+}$ in the solution as ferrous precipitate and to thereby obtain a suspension;
   introducing an oxidative gas into the suspension while maintaining it at a temperature of 60° to 90°C and fully agitating it while continuously adding an alkali to the suspension so as to always maintain the pH of the suspension at a value in the range of 5 to 6 with a tolerance of ±0.05, to thereby form particles of spinel-type iron oxide ($FeO_x \cdot Fe_2O_3$ wherein $0 < x \leq 1$) having a uniform quality; and
   suspending the particles of spinel-type iron oxide in an aqueous solution having a pH of 3.5 to 5.0 as adjusted with sulfuric acid or nonoxidative inorganic acid to solubilize polyvalent manganese contained in the particles of spinel-type iron oxide, subsequently separating the particles of spinel-type iron oxide from the suspension by filtration, washing the particles with water, and drying the same to obtain particles of spinel-type iron oxide having a manganese content of less than 0.2% by weight calculated as MnO.

2. The process of claim 1 further comprising the step of roasting at a temperature of 120° to 300°C the last-mentioned spinel-type iron oxide powder to produce a gamma-$Fe_2O_3$ powder.

3. The process of claim 2 further comprising the steps of adding an amount of sulfuric acid or sulfate capable of giving a non-coloring substance when decomposed at a temperature of below 850°C to the gamma-Fe$_2$O$_3$ powder and roasting the resulting mixture at a temperature of 450° to 850°C, the amount of sulfuric acid or sulfate calculated as the weight of sulfuric acid radicals therein being at least 3 times the amount, calculated as the weight of MnO, of manganese oxides contained in the gamma-Fe$_2$O$_3$ powder, to obtain a powder of red iron oxide (alpha — Fe$_2$O$_3$) for use as a pigment.

4. The process of claim 3 wherein the sulfate is at least one compound selected from the group consisting of ammonium sulfate, aluminum sulfate and ferrous sulfate.

5. The process of claim 2 further comprising the step of roasting at a temperature of 450°–850°C the gamma-Fe$_2$O$_3$ powder.

6. The process of claim 1 further comprising the steps of adding an amount of sulfuric acid or sulfate capable of giving a non-coloring substance when decomposed at a temperature of below 850°C to the last-mentioned spinel-type iron oxide powder, and roasting the resulting mixture at a temperature of 450° to 850°C, the amount of sulfuric acid or sulfate calculated as the weight of sulfuric acid radicals therein being at least 3 times the amount, calculated as the weight of MnO, of manganese oxides contained in the spinel-type iron oxide to produce a powder of red iron oxide (alpha — Fe$_2$O$_3$) for use as a pigment.

7. The process of claim 6 wherein the sulfate is at least one compound selected from the group consisting of ammonium sulfate, aluminum sulfte, and ferrous sulfate.

8. The process of claim 1 wherein the waste liquid is a waste liquid containing ferrous salts and is discharged from a process for manufacturing titanium dioxide or from a process for pickling sheet steel.

9. The process of claim 1 wherein the starting solution is directly or indirectly prepared from the waste liquid or is an aqueous solution of ferrous salt crystals obtained from the waste liquid.

10. The process of claim 1 wherein the alkali is at least one member selected from the group consisting of NaOH, NH$_4$OH, and ammonia gas.

11. The process of claim 1 further comprising the step of roasting at a temperature of 450°—850°C the last-mentioned spinel-type iron oxide powder to produce a powder of red iron oxide (alpha — Fe$_2$O$_3$).

12. The process of claim 1 wherein at least one inorganic salt selected from the group consisting of sodium sulfate, ammonium sulfate, ammonium chloride, and sodium chloride is recovered and removed in conventional manner from the filtrate obtained therein.

\* \* \* \* \*